(12) United States Patent
Brewer et al.

(10) Patent No.: US 9,957,708 B2
(45) Date of Patent: May 1, 2018

(54) CONSTRUCTION DEVICE INTRODUCED INTO AN ELECTRICAL POWER PLANT MODULE

(71) Applicant: Aruana Energia S/A, Goiania (BR)

(72) Inventors: Brian Ray Brewer, Santa Catarina (BR); Robert James McKinnon, Santa Catarina (BR)

(73) Assignee: ARUANÃ ENERGIA S/A, Goiania (BR)

(*) Notice: Subject to any disclaimer, the term of this patent is extended or adjusted under 35 U.S.C. 154(b) by 181 days.

(21) Appl. No.: 15/035,148

(22) PCT Filed: Nov. 17, 2014

(86) PCT No.: PCT/BR2014/000416
§ 371 (c)(1),
(2) Date: May 6, 2016

(87) PCT Pub. No.: WO2016/061648
PCT Pub. Date: Apr. 28, 2016

(65) Prior Publication Data
US 2016/0273211 A1   Sep. 22, 2016

(30) Foreign Application Priority Data
Oct. 23, 2014   (BR) .............................. 202014026458

(51) Int. Cl.
*F02B 63/04*   (2006.01)
*H02K 7/18*   (2006.01)
(Continued)

(52) U.S. Cl.
CPC ........ *E04B 1/34336* (2013.01); *B65D 88/121* (2013.01); *B65D 88/56* (2013.01);
(Continued)

(58) Field of Classification Search
CPC ..... E04B 1/34336; B65D 88/56; B65D 88/74; B65D 88/121; B65D 90/008; E04H 1/12; H02K 5/04; H02K 7/1807; H02K 15/14
(Continued)

(56) References Cited

U.S. PATENT DOCUMENTS 3,602,730 A * 8/1971 Cushing ................ B63B 25/004
                                                              114/72
4,548,164 A * 10/1985 Ylonen ................... F02B 63/04
                                                              123/195 C
(Continued)

FOREIGN PATENT DOCUMENTS

BR   MU8600241-4 U   10/2007
BR   PI0605454-4 A   7/2008
(Continued)

*Primary Examiner* — Tulsidas C Patel
*Assistant Examiner* — Thomas Quigley
(74) *Attorney, Agent, or Firm* — Blank Rome LLP

(57) ABSTRACT

"CONSTRUCTION DEVICE INTRODUCED INTO AN ELECTRICAL POWER PLANT MODULE", more specifically relating to an electrical power plant module (1) of the type used for accessibility to electrical energy, primarily in remote areas such as isolated rural communities, mining camps, oil platforms, areas recently affected by storms, areas affected by earthquakes, offshore platforms, etc., or areas undergoing conflict; the said power plant module (1) is supplied in the form of enclosures or containers (2) of the ISO maritime type and includes a structural container (2A) having a flat base (2*b*) upon which are installed structural columns (C1) and crossmembers (T2) for the mounting of plates (cp) that form the peripheral walls (2C) and the upper wall (2D) of the container (2A), with the end walls (2C1) of the container (2A) providing at least one cut-out area (2*c*2) for the installation of a tilting door (3) designed for the superolateral expulsion of hot air (AR) from the radiator (R); the said tilting door (3) is installed in the respective cut-out
(Continued)

area (2c2) by means of hinged closures (4) or other articulated and/or tilting closures, which closures (4) in turn are secured to the lower edge (3a) of the door (3) in such a way that when the door (3) is tilted outward from the container, with an angulation (α), it forms a gas conduit (CG) in order to direct the air (AR) toward the superolateral portion of the structural container (2A): the tilting doors (3) that are installed in the extreme lateral portions (2C1) of the container (2A) are arranged in the substations (SB) of the power plant module (1) in such a way that they are aligned longitudinally with corresponding cooling units (UR) that are located on the inside and at the end in relation to the transformer/distribution unit (UT).

11 Claims, 13 Drawing Sheets

(51) Int. Cl.
| | | |
|---|---|---|
| E04B 1/343 | (2006.01) | |
| B65D 88/56 | (2006.01) | |
| H02K 5/04 | (2006.01) | |
| H02K 15/14 | (2006.01) | |
| B65D 88/12 | (2006.01) | |
| B65D 88/74 | (2006.01) | |
| B65D 90/00 | (2006.01) | |
| E04H 1/12 | (2006.01) | |

(52) U.S. Cl.
CPC ........... *B65D 88/74* (2013.01); *B65D 90/008* (2013.01); *E04H 1/12* (2013.01); *H02K 5/04* (2013.01); *H02K 7/1807* (2013.01); *H02K 15/14* (2013.01); *E04H 2001/1283* (2013.01)

(58) Field of Classification Search
USPC .......................................................... 290/1 A
See application file for complete search history.

(56) References Cited

U.S. PATENT DOCUMENTS

| | | | | |
|---|---|---|---|---|
| 5,216,285 | A * | 6/1993 | Hilsenteger | B60L 1/04 307/12 |
| 6,895,903 | B2 * | 5/2005 | Campion | F02B 63/04 123/2 |
| 7,543,793 | B2 * | 6/2009 | Graham | F16M 1/00 248/639 |
| 7,576,442 | B2 * | 8/2009 | Auer | F02B 43/10 290/1 A |
| 7,615,876 | B2 * | 11/2009 | Marshall | F02B 63/04 290/1 A |
| 8,373,289 | B2 * | 2/2013 | Hunter | H01M 8/04201 123/2 |
| 8,816,518 | B2 | 8/2014 | Campion et al. | |
| 2003/0029390 | A1 * | 2/2003 | Campion | F02B 63/04 123/2 |
| 2003/0030246 | A1 * | 2/2003 | Campion | B60P 3/00 280/423.1 |
| 2006/0006652 | A1 * | 1/2006 | Witten | F02B 63/04 290/1 A |
| 2008/0048456 | A1 * | 2/2008 | Browning | H02K 7/1823 290/1 A |
| 2009/0066091 | A1 * | 3/2009 | Hunter | H01M 8/04201 290/1 A |
| 2010/0301672 | A1 * | 12/2010 | Di Cristofaro | H02B 1/52 307/39 |
| 2012/0181795 | A1 * | 7/2012 | Lobsiger | F02D 29/06 290/1 A |
| 2013/0147203 | A1 * | 6/2013 | Gillett | H02K 5/20 290/1 A |
| 2014/0332549 | A1 * | 11/2014 | Williams | F01N 13/08 220/810 |
| 2015/0303770 | A1 * | 10/2015 | Beissler | H02K 7/1815 290/1 A |

FOREIGN PATENT DOCUMENTS

| | | |
|---|---|---|
| BR | MU9002049-9 U2 | 5/2013 |
| WO | WO-2012/118491 A1 | 9/2012 |
| WO | WO-2014/120429 A2 | 8/2014 |

* cited by examiner

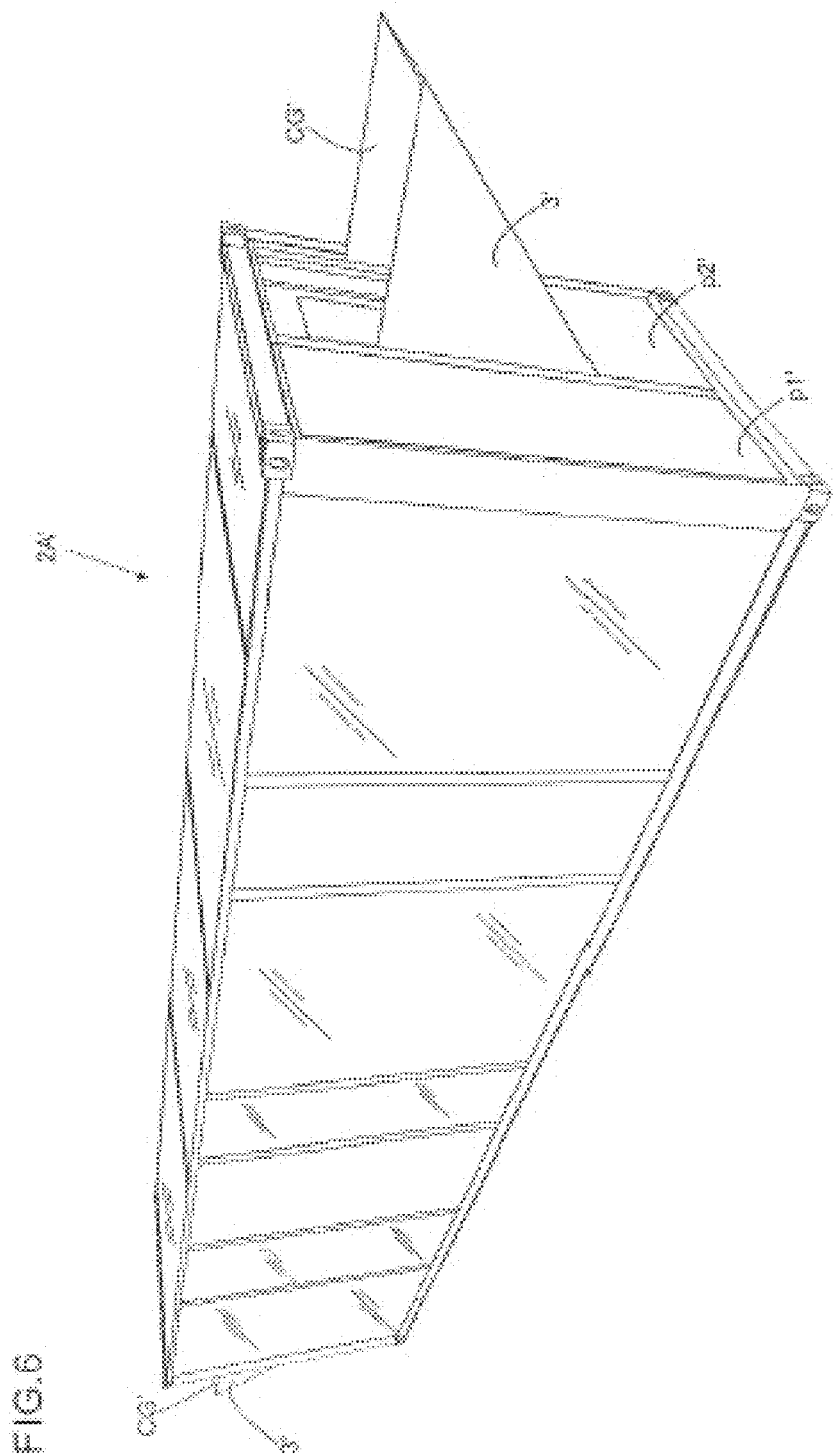

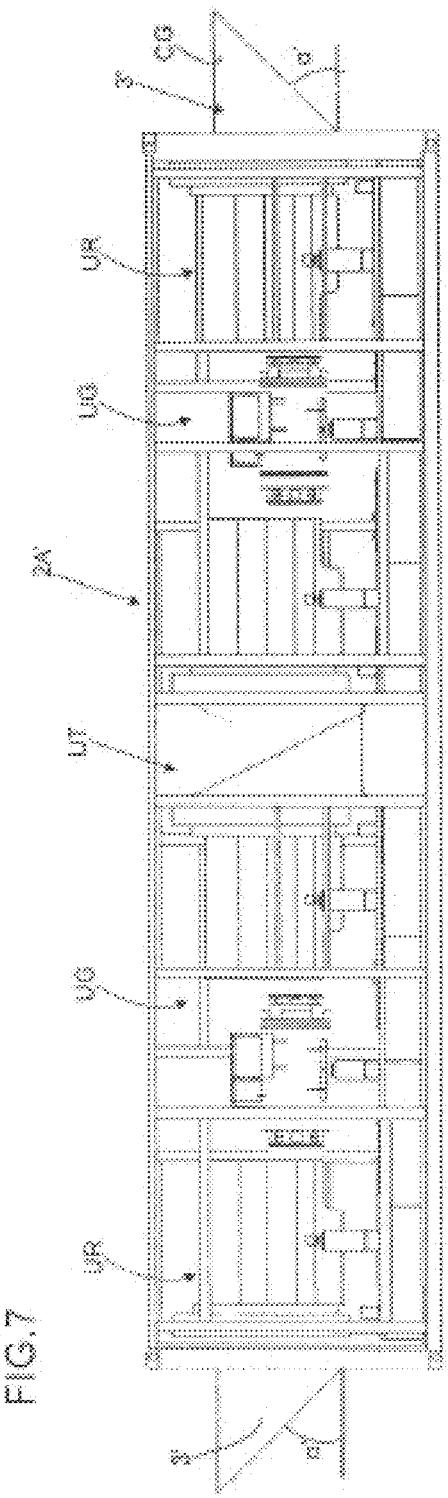

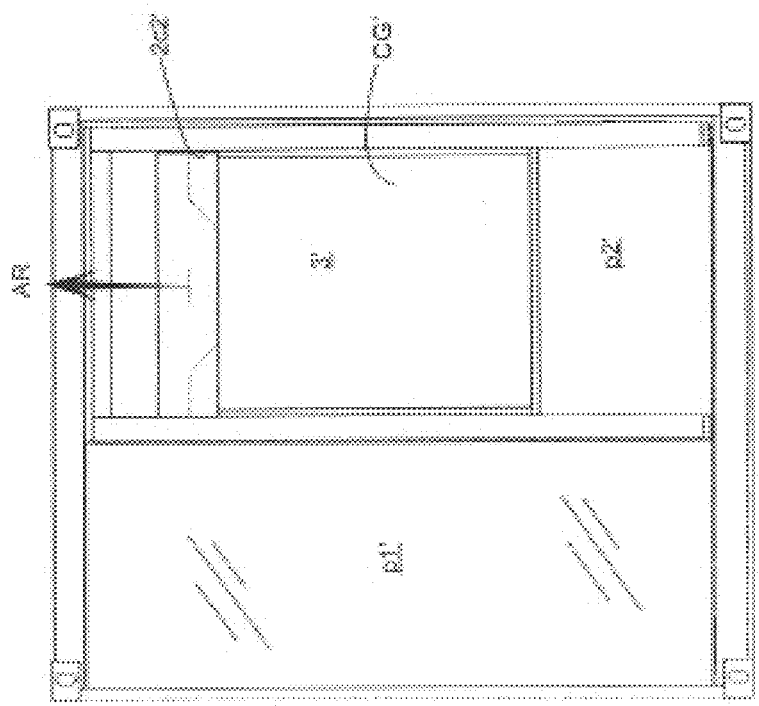
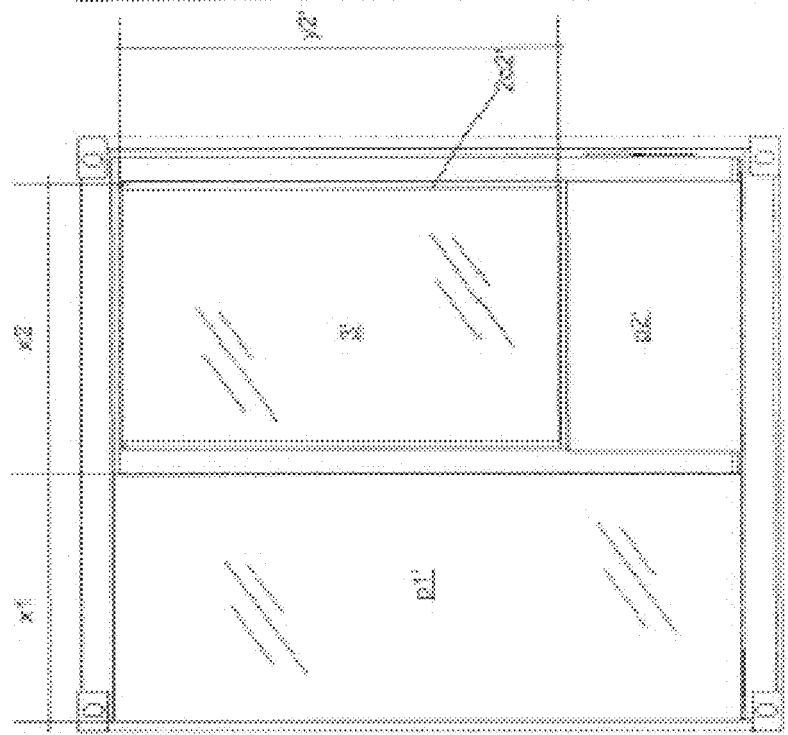

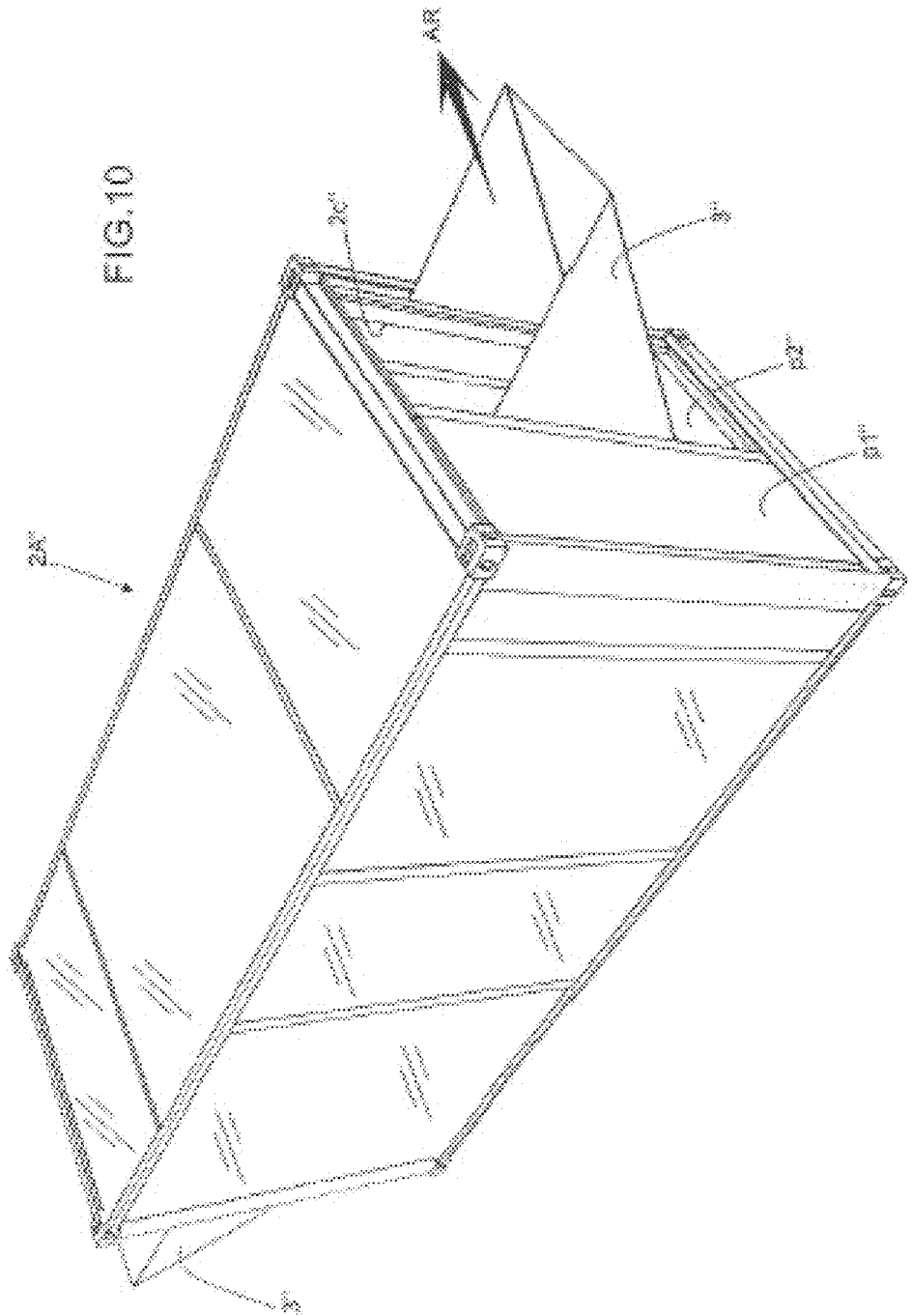

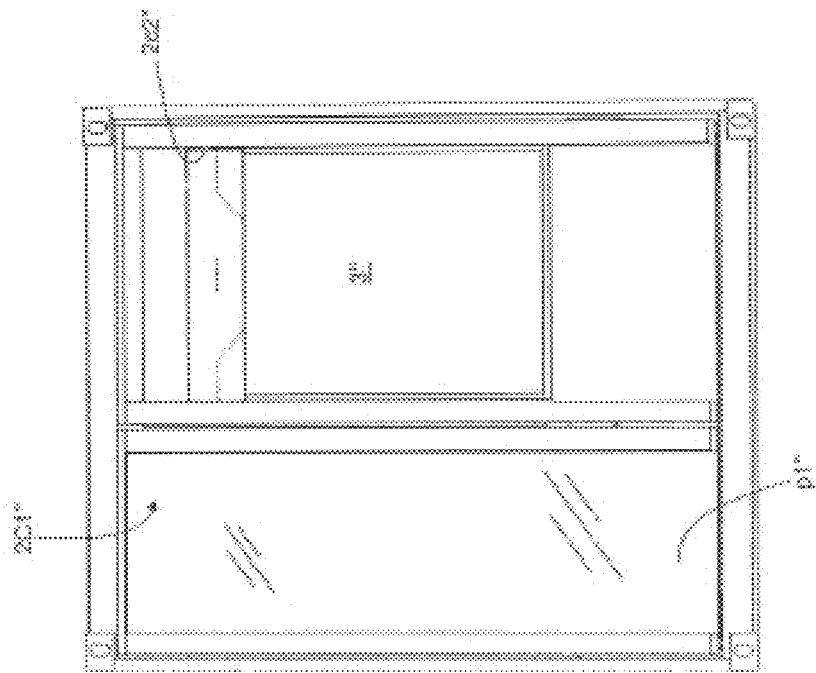
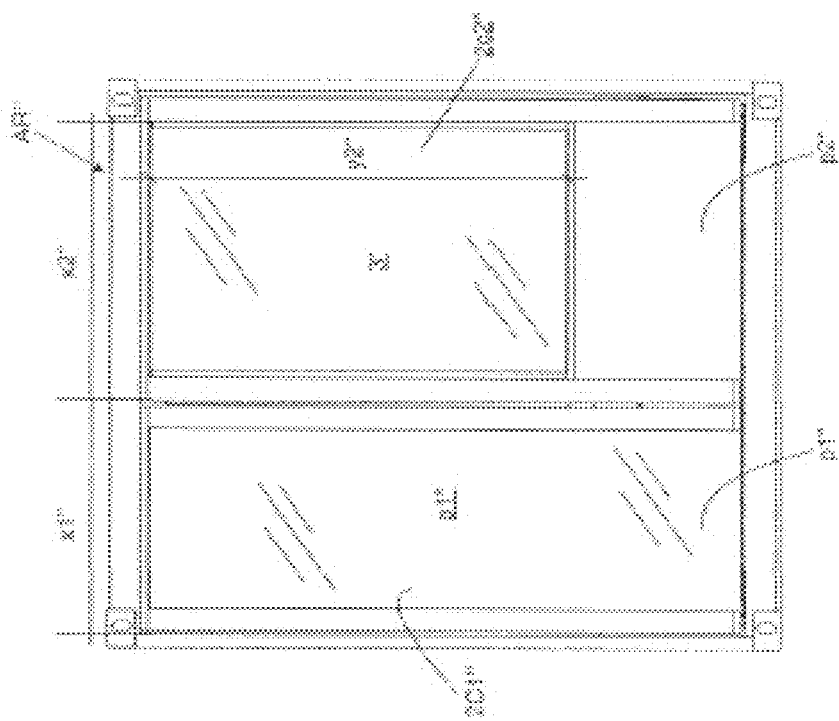

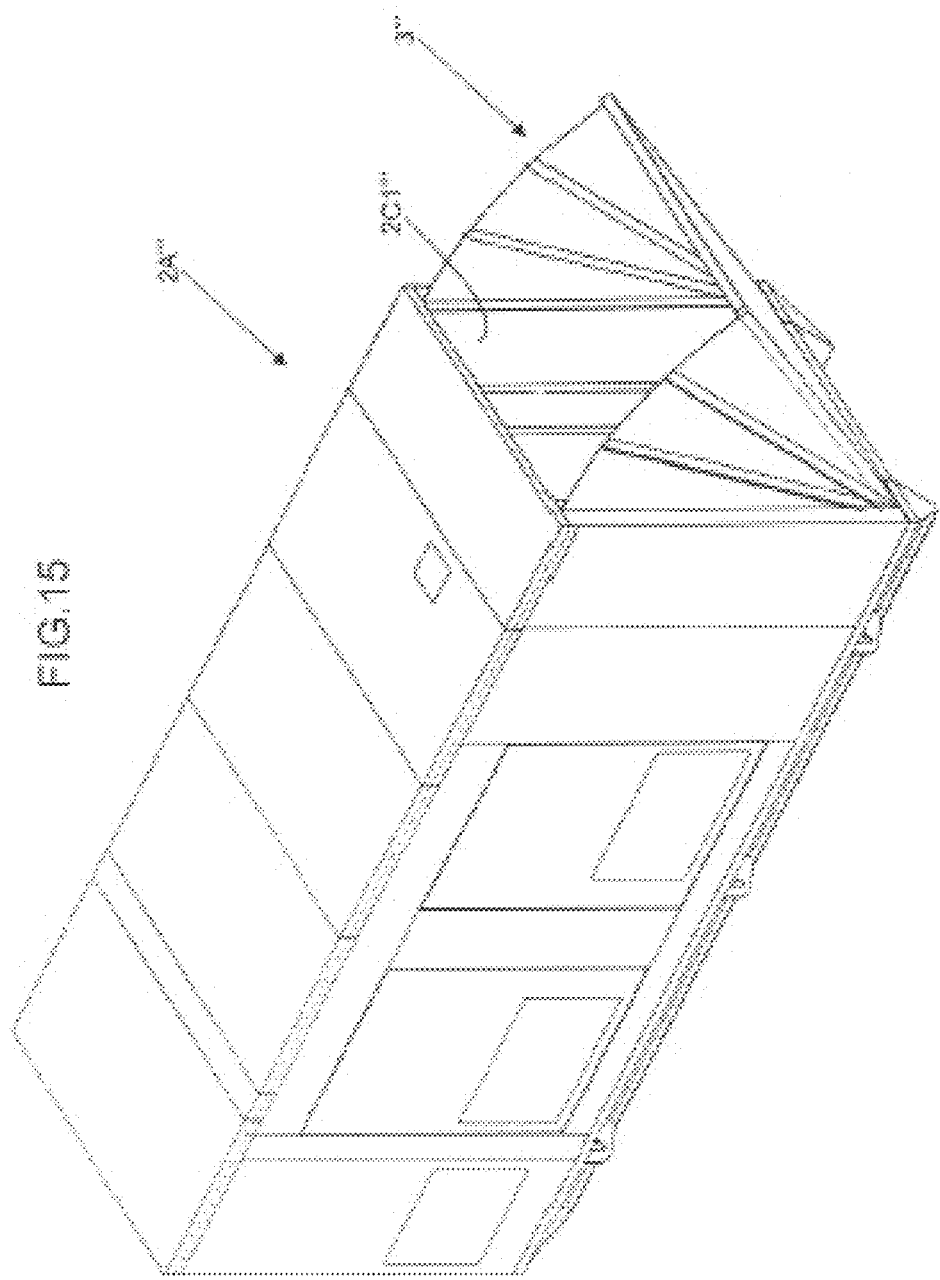

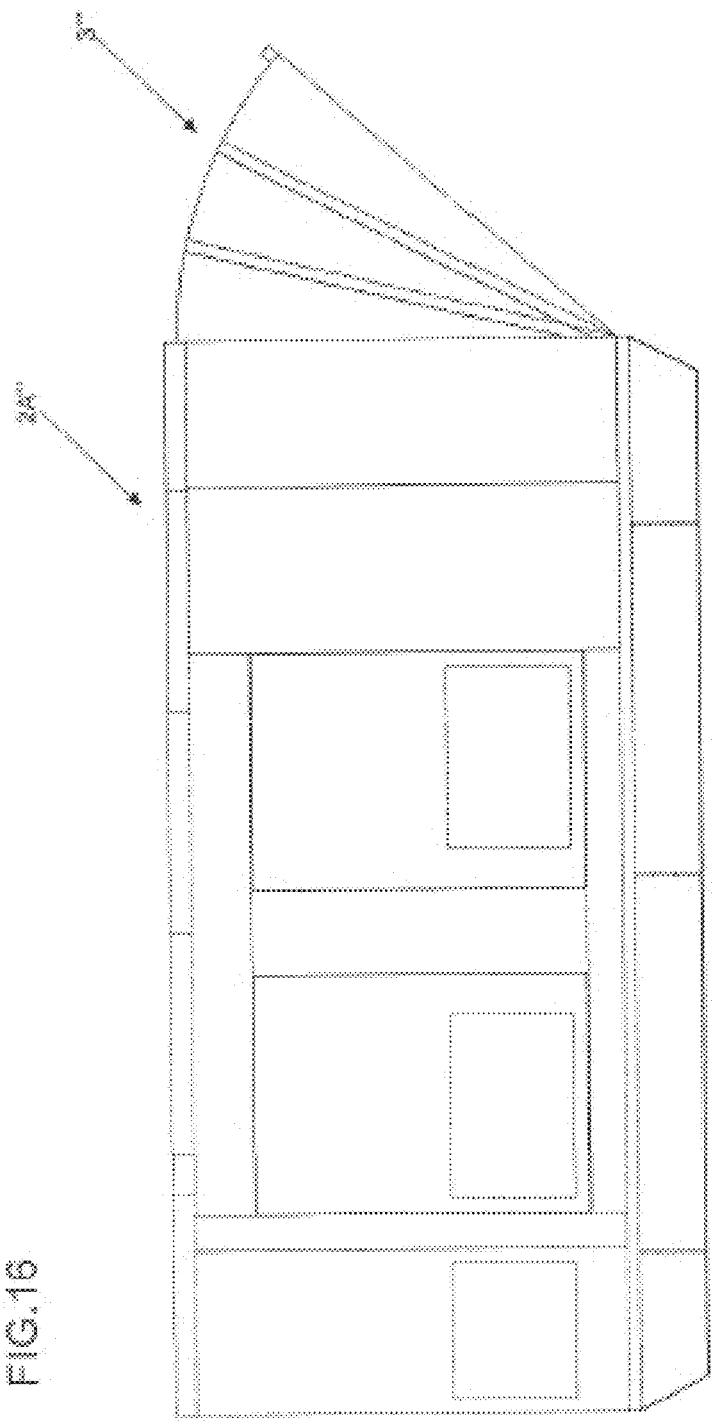

CONSTRUCTION DEVICE INTRODUCED INTO AN ELECTRICAL POWER PLANT MODULE

CROSS REFERENCE TO RELATED APPLICATIONS

This application is a national phase of PCT/BR2014/000416, filed Nov. 17, 2014, which claims priority to Brazilian Patent Application No. 202014026458, filed on Oct. 23, 2014, both of which are hereby incorporated herein by reference in their entirety.

TECHNICAL BACKGROUND

This utility model relates to a new construction device introduced into an electrical power plant module, in which, most notably, the said module is supplied in the form of enclosures or 20-foot or 40-foot containers of the ISO maritime type, with the structural container including tilting doors designed for the superolateral expulsion of hot air from the radiators of cooling units or other exhaust gases, along with an arrangement that is different from other existing arrangements, entailing improvements in the use of this type of container, inasmuch as it provides more space inside the container for the installation of larger and more powerful generator sets.

STATE OF THE ART

Some installations of modular generators are already known that enable access to electrical energy, primarily in remote areas such as isolated rural communities, mining camps, oil platforms, areas recently affected by storms, areas affected by earthquakes, offshore platforms, etc., or areas undergoing conflict or in which other exigent circumstances are present.

Generally speaking, the said modular generators consist of container, enclosures, or similar structures in which motors, generator sets, and refrigeration or cooling systems are installed, along with other equipment and devices. However, although these conventional modular generators make electrical energy available, they require additional equipment in order to be used, because they do not include means for direct connections to the energy distribution system present in the area, and therefore require the installation of additional equipment and structures, such as step-up transformers, external low-voltage power lines, fuses, external tanks, oil containers, civil engineering structures, etc., thereby hindering or precluding the installation of the generator module.

Another disadvantage lies in the fact that conventional generator containers have physical structures that require major operations for transportation to, and installation in, the desired area, thereby making the project complex and expensive.

Another disadvantage lies in the fact that generators located within conventional enclosures or containers nevertheless are constructed with internal air-exhaust and heat-exchange systems that do not allow them to be stacked, because the majority of the air outlets are located on the upper surface of the enclosures or containers, thereby limiting the possibility of saving space. This disadvantage is highly detrimental to the spatial logistics of the installation site, particularly for areas in which the footprint cannot be expanded, as is the case, for example, on oil rigs, where each area is designed and calculated specifically for the installation of essential equipment.

The present applicant, which is active in the area of the development of generators and other equipment, has filed documents No. BR2020130292678, which relates to a modular electrical power plant that has a high-voltage transformer system intended to be connected directly to the energy distribution system. Incorporated into containers or similar structures of the type used to provide energy in remote areas, such as isolated rural communities, mining camps, oil platforms, areas recently affected by storms, areas affected by earthquakes, etc., or areas in which the conventional supply of energy is not present. This modular electrical power plant is supplied in the form of a 20-foot or 40-foot container of the ISO maritime type that contains of a set of integrated units and that can generate medium-voltage energy in order to feed the local energy distribution system.

Accordingly, being familiar with the disadvantages of the current state of the art, and as a company that is engaged in the development of solutions, the present applicant has envisioned the possibility of continuing to maintain an optimal temperature exchange inside the container while still allowing the stacking of one or more enclosures or containers possessing identical characteristics, thereby solving some of the current problems.

ANALYSIS OF THE STATE OF THE ART

Through research conducted in specialized databases, documents were found that refer to containers equipped with electrical energy generators, such as, for example, documents No. PI 0605454-4, MU 9002049-9, and MU 8600241-4. Although these devices consist of containers equipped with means for the generation of electrical energy, they have the primary disadvantage of requiring additional components for connecting the said means to the electrical energy distribution network, thereby making their installation more difficult.

Another document, No. WO2014120429, that was found refers to a portable modular power plant that includes an electrical substation that contains a reservoir with a first transformer and a second transformer located at the first and second extremities of the reservoir substation, and a plurality of containers for electrical generating modules, each of which is positioned in relation to a corner of the substation module, in which each electrical generating module is linked to one of the two transformers.

Although the power plant module appears to be portable, it has characteristics that are different from those of the power plant module that is the subject of the present application, consisting primarily of the fact that it lacks any stacking and ventilation means, as claimed in the present application.

GOALS OF THE INVENTION

Accordingly, with a view toward providing improvements to the consumer market, the applicant has developed the present construction device introduced into an electrical power plant module, of the type supplied in the form of enclosures or in 20-foot or 40-foot containers of the ISO maritime type.

Such a container includes a structural container having a flat base upon which are installed structural columns and crossmembers for the mounting of plates that form the peripheral walls and the upper wall of the container, with the end walls of the container providing at least one cut-out area for the installation of a tilting door designed for the superolateral expulsion of hot air from the radiator installed in the said cooling unit, as well as for the venting of other exhaust gases.

The said tilting door is installed in the respective cut-out area by means of hinges that in turn are secured to the lower edge of the door, which also includes a single piece having a U-shaped cross-section formed by a front plate whose lateral edges develop V-shaped peripheral walls. The articulation of the tilting door includes an angular gas conduit that continuously directs the gases toward the superolateral portion of the structural container.

The provision of tilting doors in the lateral extreme walls of the structural container allows a new arrangement of the substations, with the cooling units being parallel to the lateral wall of the structural container, the transformer/distribution unit being installed in the central portion of the container, and the parallel generator unit(s) being located between the transformer units and the cooling units.

Furthermore, the provision of tilting doors in energy-generation containers for the escape of gases from the cooling unit provides more space inside the module, thereby enabling the installation of larger and more powerful generator sets.

The major advantage lies in the fact that the addition of the tilting doors for the creation of angular gas conduits that direct the gases, so that they can be vented, toward the superolateral portion of the structural container allows the power plant units to be stacked, thereby enabling the creation of mini-power plants with a reduced footprint that make more efficient use of the available physical space.

Another advantage lies in the fact that the tilting doors can be implemented in modular power plants with a substation built into the container, and in containers with power ratings of 2×700 kVA, 2×550 kVA, 2×750 kVA, and 4×700 kVA.

Yet another advantage lies in the fact that the provision of tilting doors in the lateral extreme portions of the power plant module enables a new arrangement for the layout of the radiators on both sides of the container.

Yet one more advantage lies in the fact that the provision of the tilting doors in the power plant module entails a reduction in the manufacturing costs of the module, because the presence of the tilting doors reduces the length of the enclosure and of the base by approximately 1.5 meters.

DESCRIPTION OF THE FIGURES

As a supplement to the present description, and in order to enable a better understanding of the characteristics of the utility model in accordance with a preferred embodiment of it, the present description is accompanied by a set of drawings that include, for illustrative purposes and non-limitatively, the following figures:

FIG. 6 is a perspective view of a second embodiment of the arrangement of the tilting door in the modular power plant;

FIG. 7 is a front view of the second embodiment, showing the tilting doors in the open position;

FIGS. 8 and 9 are side views of the power plant module showing the second variant of the arrangement of the tilting door;

FIG. 10 is a front view of the power plant module showing the stacking;

FIG. 12 is a front view of the third embodiment, showing the tilting doors in the open position; and FIGS. 13 and 14 are side views of the power plant module, showing the third variant of the arrangement of the tilting door; and FIG. 15 is a front view of the power plant model showing the stacking.

FIG. 16 is a side view of an enclosure with the tilting door open.

DETAILED DESCRIPTION OF THE SUBJECT

Figure 1:
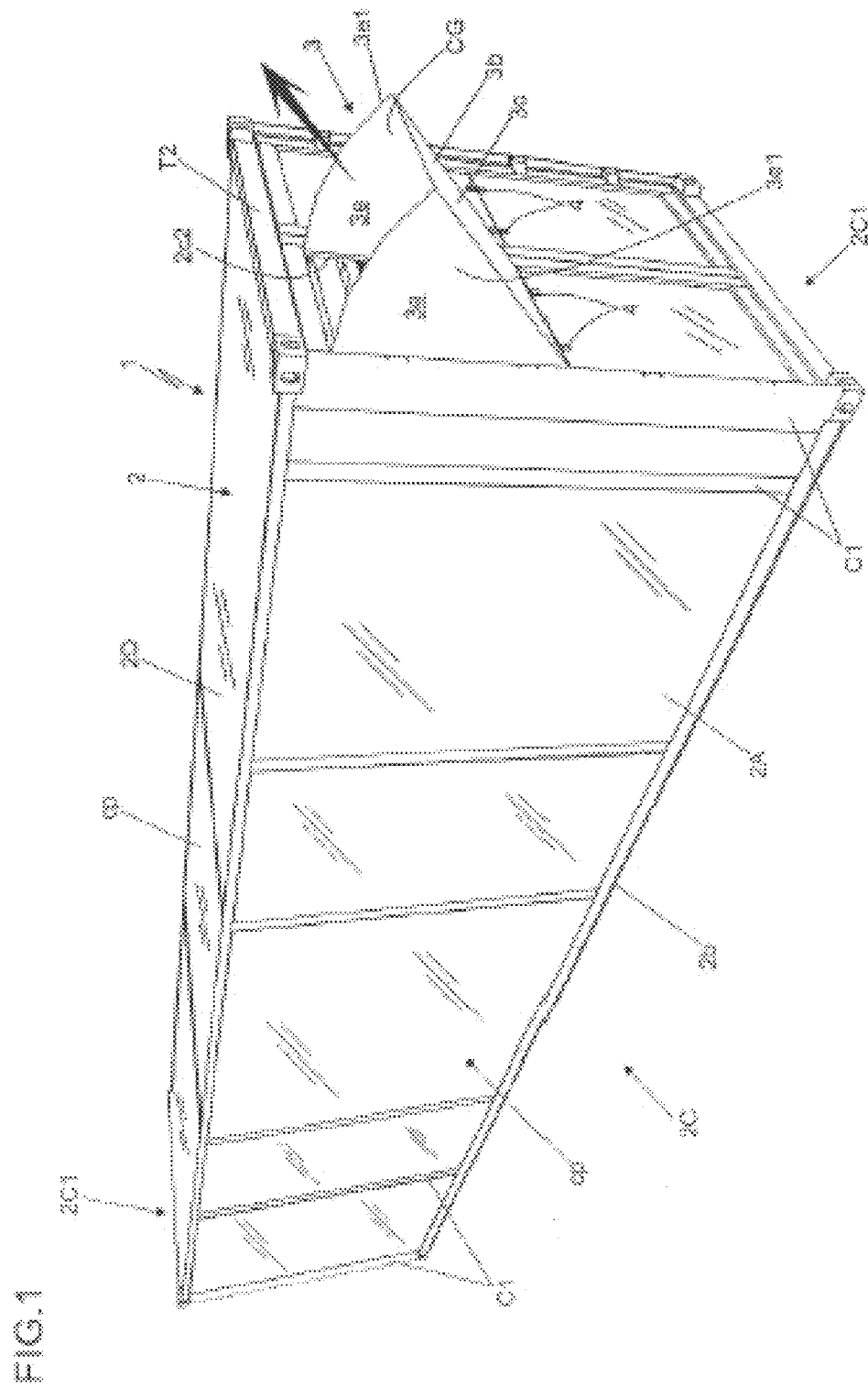
FIG. 1 is a perspective view of the power plant module, in the form of a first embodiment containing an arrangement of tilting doors.
Figure 2:
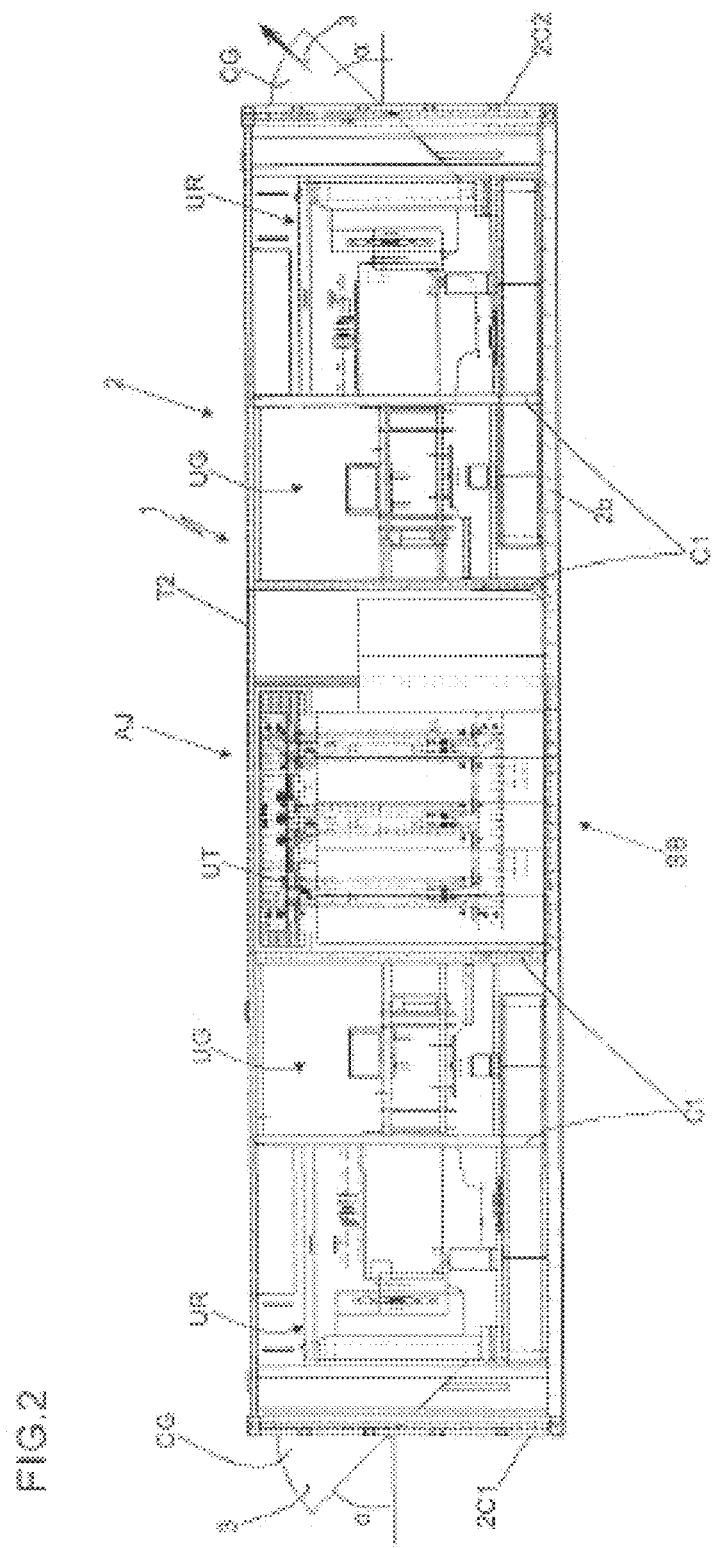
FIG. 2 is a front view.

With reference to the drawings as shown, the present utility model refers to a "CONSTRUCTION DEVICE INTRODUCED INTO AN ELECTRICAL POWER PLANT MODULE", more specifically relating to an electrical power plant module (1) of the type used for accessibility to electrical energy, primarily in remote areas such as isolated rural communities, mining camps, oil platforms, areas recently affected by storms, areas affected by earthquakes, offshore platforms, etc., or areas undergoing conflict. The said power plant module (1) is supplied in the form of enclosures or 20-foot or 40-foot containers (2) of the ISO maritime type.

According to the present utility model, the enclosure or container (2) that constitutes the electrical power plant module (1) includes a structural container (2A) having a flat base (2*b*) upon which are installed structural columns (C1) and crossmembers (T2) for the mounting of plates (cp) that form the peripheral walls (20) and the upper wall (20) of the container (2A), with the end walls (2C1) of the container (2A) providing at least one cut-out area (2*c*2) for the installation of a tilting door (3) designed for the superolateral expulsion of hot air (AR) from the radiator (R). The said tilting door (3) is installed in the respective cut-out area (2*c*2) by means of hinged closures (4) or other articulated and/or tilting closures, which closures (4) in turn are secured to the lower edge (3*a*) of the door (3) in such a way that when the door (3) is tilted outward from the container, with an angulation (α), it forms a gas conduit (CG) in order to direct the air (AR) toward the superolateral portion of the structural container (2A).

The tilting doors (3) that are installed in the lateral extreme portions (2C1) of the container (2A) are arranged in the substations (SB) of the power plant module (1) in such a way that they are aligned longitudinally with corresponding cooling units (UR) that are located on the inside and at the end in relation to the transformer/distribution unit (UT).

In the preferred embodiment (as shown in FIG. 1 through FIG. 5), the tilting door (3) includes a single piece (3*b*) having a U-shaped cross-section formed by a front plate (3*c*) whose peripheral form is identical to the form of the cut-out area (2*c*2) in the lateral walls (2C1), with the lateral edges (3*d*) of the plate (3*c*) developing V-shaped peripheral walls (3*e*) whose upper edges (3*e*1) are slightly arched.

Figure 4:
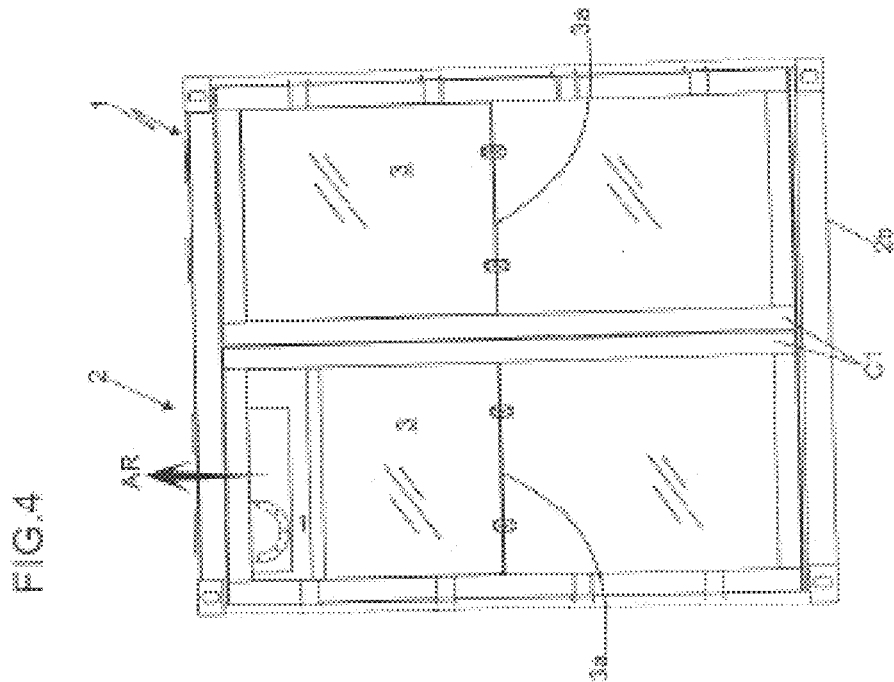
FIGS. 3 and 4 are side views of the power plant module, showing the layout of the doors in their fully closed position and with one door tilted.
Figure 3:
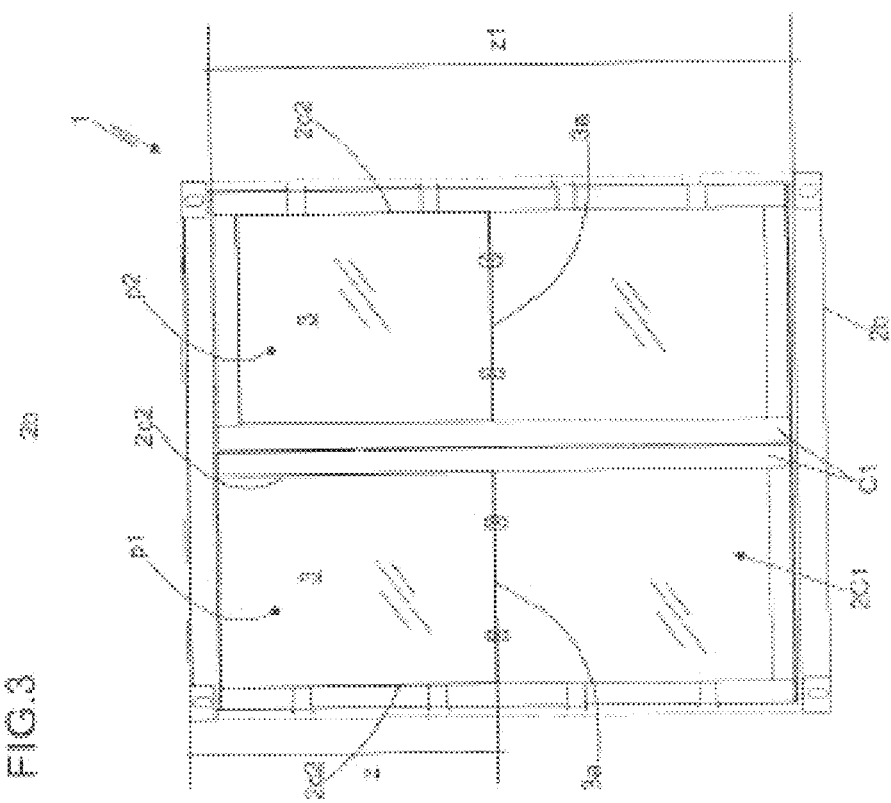
Figure 5:
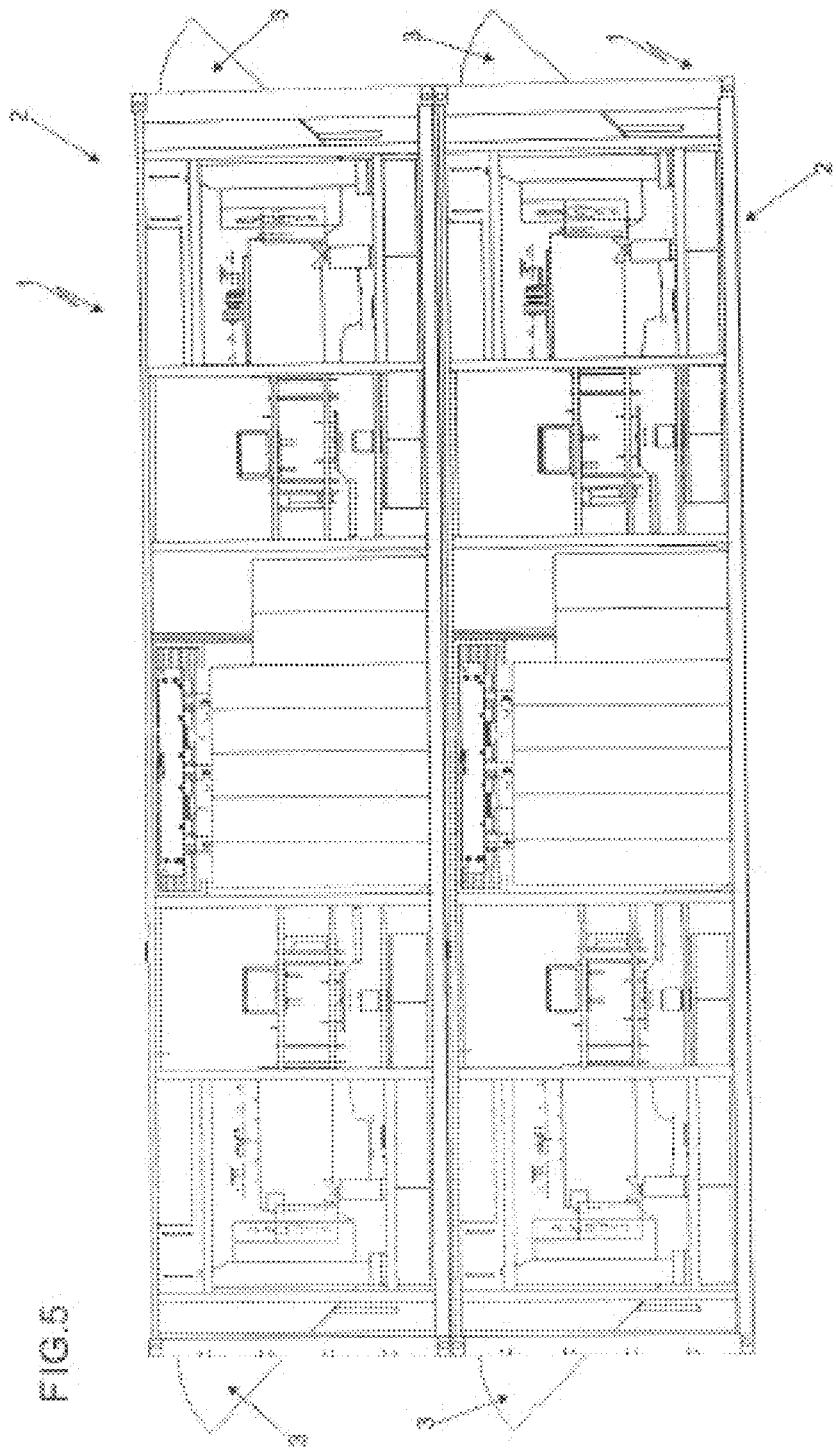
FIG. 5 is a front view of the power plant module showing the stacking.
Figure 11:
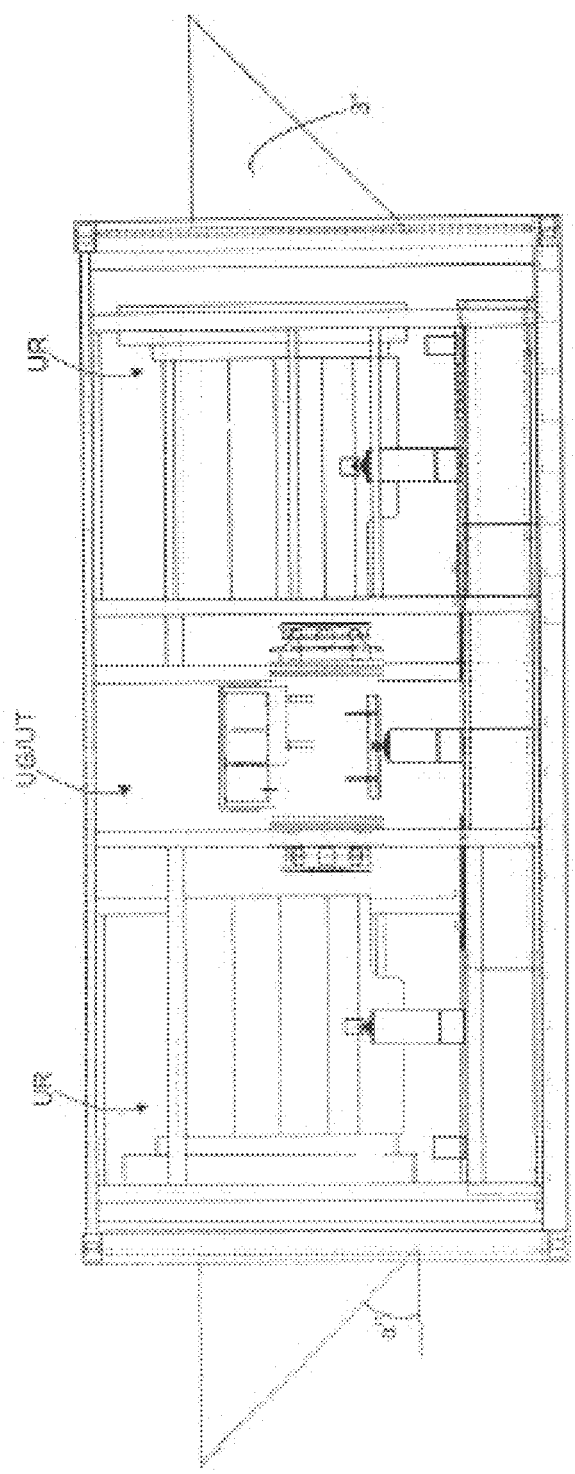
FIG. 11 is a perspective view of a third embodiment of the arrangement of the tilting door in the power plant module.
Figure 14:

In the first version of the arrangement of the tilting doors (3) of the container (2A) (as shown in FIG. 3 and FIG. 4), both of the lateral walls (2C1) have a pair of central columns (C1) that define a pair of parallel areas (p1) and (p2), each of which includes a cut-out area (2c2) whose length (z) consists of one-half of the overall length (z1) of the wall (2C1) of the container (2A). Each cut-out area (2c2) receives respective tilting doors (3) constituting a pair of gas conduits (CG) with an angulation ($\alpha$).

In a second version of the arrangement of the tilting doors (3') of the container (2A') (as shown in FIG. 7 through FIG. 10), the areas (p1') of both of the lateral walls (2C1') have a reduced width (x1') in relation to the width (x2') of the area (p2'), in which, in turn, a cut-out area (2c2') is present that is approximately ⅔ of the overall length (y2') of the wall (2C1'), so as to form a single gas conduit (CG') with an angulation ($\alpha'$).

In a third version of the arrangement of the tilting doors (3") of the container (2A") (as shown in FIG. 11 through FIG. 15), the areas (p1") of both of the lateral walls (2C1") also have a reduced width (x1") in relation to the width (x2") of the area (p2"), with a cut-out area (2c2") that is approximately ⅔ of the overall length (y2") of the wall (2C1"), so as to form a single gas conduit (CG") with an angulation ($\alpha''$).

The power plant module offers significant advantages in comparison with the documents contained in the state of the art, perfectly fitting the criteria that define a utility model, in that it implements a combination and modification of existing known elements in a way that presents a new form or arrangement, resulting in a functional improvement in the use or manufacture of those elements.

The preferred embodiment of the present utility model has been described, with the proviso that any changes and/or alterations should be understood as lying within the scope of the utility model as presented.

The invention claimed is:

1. An electrical power plant module comprising: a container having a flat base upon which is installed structural columns and crossmembers for mounting of plates that form peripheral walls and an upper wall of the container, with end walls of the container providing at least one cut-out area for the installation of a tiltable door designed for superolateral expulsion of hot air from a radiator contained within the container; the door is installed in the cut-out area via hinged closures or other articulated and/or tilting closures, which closures in turn are secured to the lower edge of the door in such a way that when the door is tilted outward from the container, with an angulation ($\alpha$), the door forms a gas conduit in order to direct the air toward a superolateral portion of the container; wherein the door is installed in a lateral extreme portion of one of the end walls of the container and is aligned longitudinally with a corresponding cooling unit which is located inside and toward an end of the container between the door and a transformer/distribution unit.

2. The electrical power plant module of claim 1, wherein the door includes a single piece having a U-shaped cross-section formed by a front plate whose peripheral form is identical to the form of the cut-out area in the one end wall, with lateral edges of the plate developing V-shaped peripheral walls whose upper edges are slightly arched.

3. The electrical power plant module of claim 1, wherein each of the end walls comprises columns that define a pair of parallel areas and, each of the parallel areas includes a cut-out area whose length is one-half of the overall length of the respective end wall of the container, and wherein each cut-out area receives respective tiltable doors constituting gas conduits capable of opening outwardly from the container with an angulation ($\alpha$).

4. The electrical power plant module of claim 1, wherein each of the end walls comprises columns that define a pair of parallel areas, wherein a first parallel area has a first width and a second parallel area has a second width which is larger than the first width, wherein the second parallel area includes the respective cut-out area whose length is approximately ⅔ of the overall length of the respective end wall of the container, and wherein the respective cut-out area receives a respective tiltable door constituting a gas conduit capable of opening outwardly from the container with an angulation ($\alpha$).

5. The electrical power plant module of claim 1, wherein at least one of the end walls comprises columns that define a pair of parallel areas, wherein a first parallel area has a first width and a second parallel area has a second width which is larger than the first width, wherein the second parallel area includes the cut-out area whose length is approximately ⅔ of the overall length of the end wall of the container, and wherein the cut-out area receives the tiltable door constituting a gas conduit capable of opening outwardly from the container with an angulation ($\alpha$).

6. The electrical power plant module of claim 1, wherein at least one of the end walls comprises columns that define a pair of parallel areas, wherein a first parallel area has a first width and a second parallel area has a second width which is larger than the first width, wherein the second parallel area includes the cut-out area, and wherein the cut-out area receives the tiltable door constituting a gas conduit capable of opening outwardly from the container with an angulation ($\alpha$).

7. The electrical power plant module of claim 1, wherein at least one of the end walls comprises columns that define a pair of parallel areas, wherein a first parallel area has a first width and a second parallel area has a second width, wherein the second parallel area includes the cut-out area whose length is approximately ⅔ of the overall length of the end wall of the container, and wherein the cut-out area receives the tiltable door constituting a gas conduit capable of opening outwardly from the container with an angulation ($\alpha$).

8. The electrical power plant module of claim 1, wherein at least one of the end walls comprises columns that define a pair of parallel areas, each of the parallel areas includes a respective cut-out area whose length is one-half of the overall length of the one end wall of the container, and wherein each cut-out area receives respective tiltable doors constituting gas conduits capable of opening outwardly from the container with an angulation ($\alpha$).

9. The electrical power plant module of claim 1, wherein at least one of the end walls comprises columns that define a pair of parallel areas, at least one of the parallel areas includes the cut-out area whose length is one-half of the overall length of the one end wall of the container, and wherein the cut-out area receives the tiltable door constituting a gas conduit capable of opening outwardly from the container with an angulation ($\alpha$).

10. The electrical power plant module of claim 1, wherein at least one of the end walls comprises columns that define a pair of parallel areas, at least one of the parallel areas includes the cut-out area, and wherein the cut-out area receives the tiltable door constituting a gas conduit capable of opening outwardly from the container with an angulation ($\alpha$).

11. The electrical power plant module of claim 1, wherein at least one of the end walls includes the cut-out area, and wherein the cut-out area receives the tiltable door constituting a gas conduit capable of opening outwardly from the container with an angulation ($\alpha$).

* * * * *